United States Patent

[11] 3,612,485

| [72] | Inventors | Loyd O. McAfee<br>9036 S.W. 37th, Seattle, Wash. 98126;<br>James P. Bohannon, 8820 S. Gayle Ave.,<br>Tacoma, Wash. 98409 |
|---|---|---|
| [21] | Appl. No. | 768,418 |
| [22] | Filed | Oct. 17, 1968 |
| [45] | Patented | Oct. 12, 1971 |

[54] AUTOMOTIVE SUSPENSION BALL JOINT CHECKING TONGS
2 Claims, 7 Drawing Figs.

[52] U.S. Cl. .................................................. 254/130
[51] Int. Cl. .................................................. B66f 3/00
[50] Field of Search .......................................... 254/10.5, 129, 130, 131; 29/219, 227, 267, 237; 81/109, 110, 418, 419

[56] References Cited
UNITED STATES PATENTS

| 1,368,966 | 2/1921 | Ooley | 81/109 X |
| 1,392,885 | 10/1921 | Battelle | 254/131 |
| 1,975,773 | 10/1934 | Davis | 29/267 X |

*Primary Examiner*—Robert C. Riordon
*Assistant Examiner*—David R. Melton
*Attorney*—Robert W. Beach

ABSTRACT: A hanger suspended by a hook from the upper control arm of an automotive wheel support carries a disengageable lever, the short end of which engages beneath the lower control arm. Downward swinging of the long arm of the lever will contract the tongs formed by the hook and short lever arm engaged with the upper and lower control arms and straddling the compression spring engaged between them. The fulcrum pin of the lever is engageable selectively with any set of socket notches in furcations of the hanger for application to differently spaced control arms. Contraction of the tongs compresses the spring between the control arms to relieve the ball joints between the spindle support and the control arms from load so that the amount of backlash between the spindle support and the control arms can be checked.

PATENTED OCT 12 1971
3,612,485
SHEET 1 OF 2
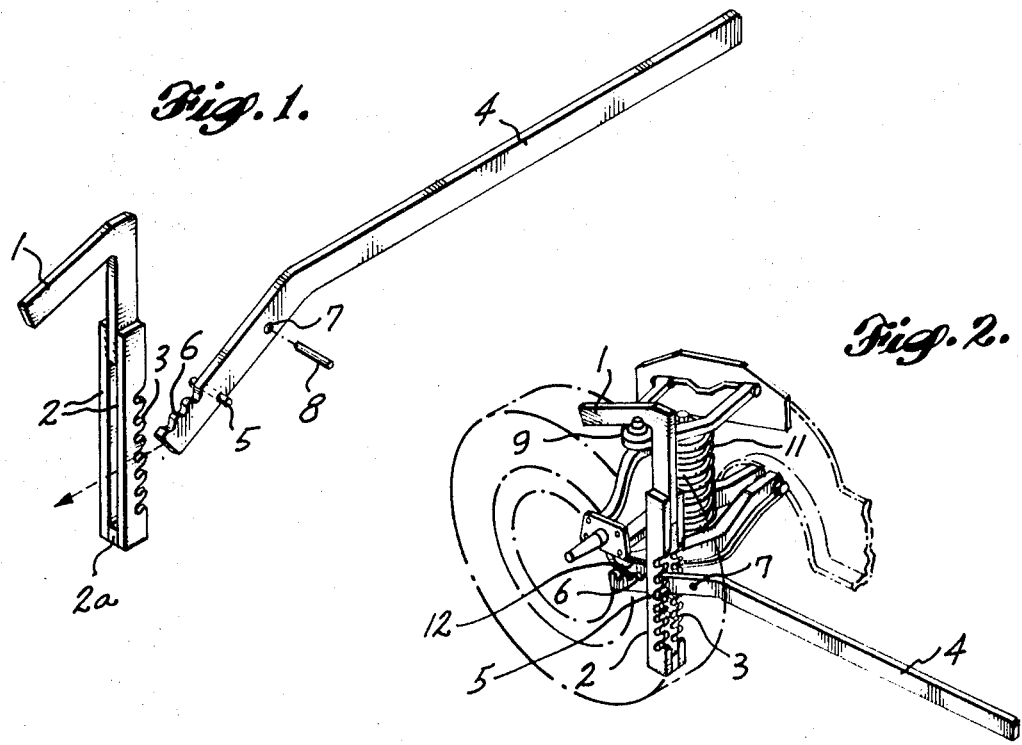
Fig. 1.
Fig. 2.
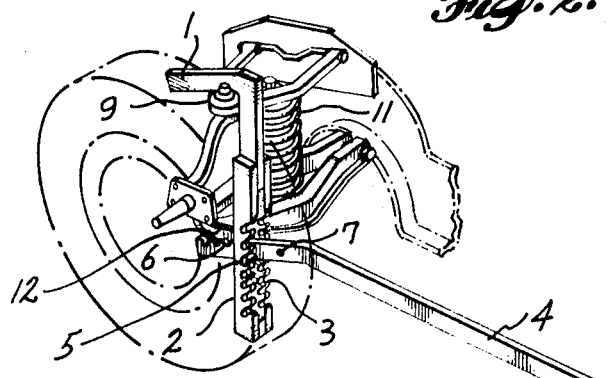
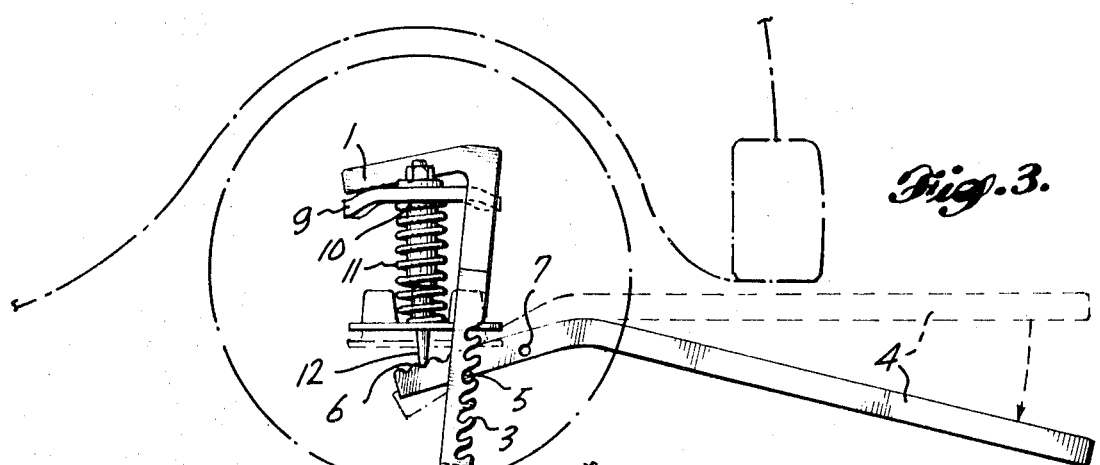
Fig. 3.
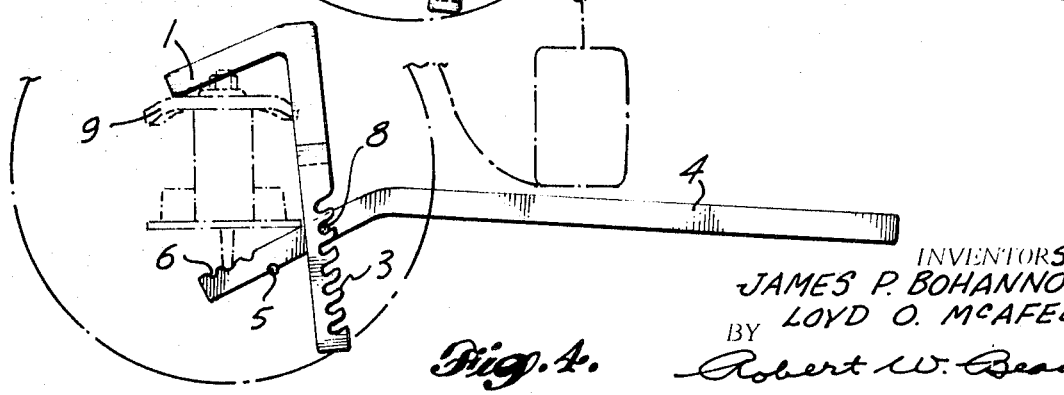
Fig. 4.
INVENTORS.
JAMES P. BOHANNON
LOYD O. McAFEE
BY Robert W. Beach
ATTORNEY

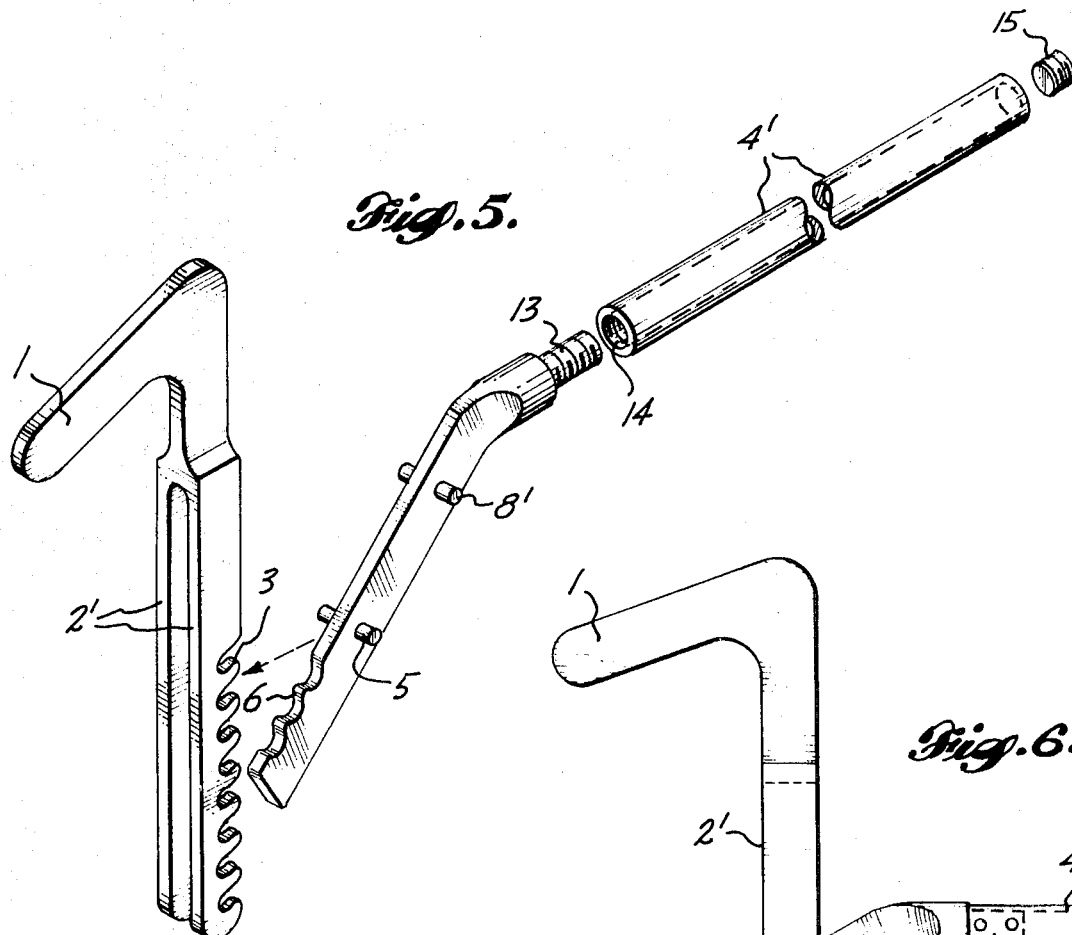
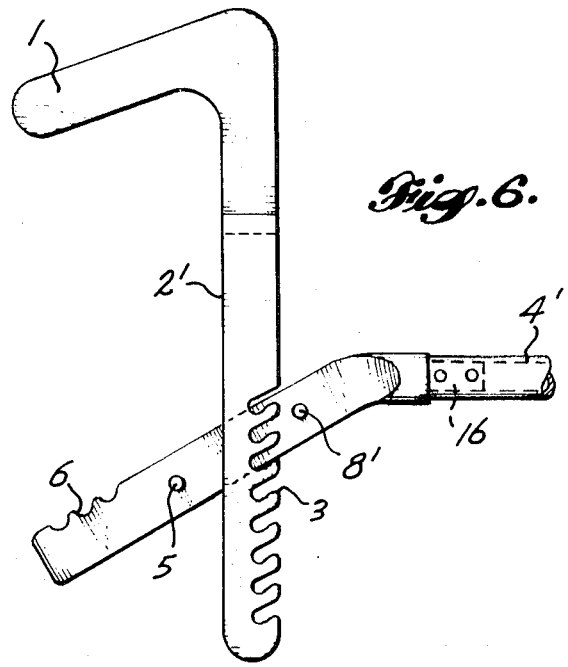
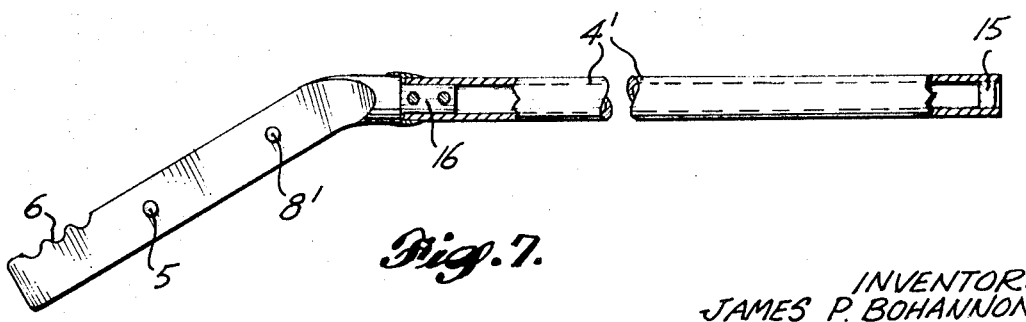

AUTOMOTIVE SUSPENSION BALL JOINT CHECKING TONGS

It is the principal object of the invention to provide a tool which can be applied to an automotive suspension, particularly for a front wheel and especially one employing a compression spring, for the purpose of checking the tightness of the ball joints of the suspension without demounting the suspension in any way.

Another object is to provide such a tool which can be applied quickly and easily to a wheel suspension for the purpose of effecting such checking.

An additional object is to provide such a tool which can be adjusted or arranged for application to wheel suspensions of different types and sizes.

A further object is to provide such a tool formed of components which can be demounted readily for convenient handling and storage.

FIG. 1 is a top perspective of the checking tongs with components being shown in exploded relationship.

FIG. 2 is a top perspective of an automobile front-wheel suspension showing checking tongs applied to it.

FIG. 3 is a side elevation of a wheel suspension with tongs in one adjusted position applied to it and FIG. 4 is a similar view with the tongs in a different adjusted position.

FIG. 5 is a top perspective of checking tongs of somewhat modified structure with parts in exploded relationship and parts broken away.

FIG. 6 is a side elevation of a portion of the tongs shown in FIG. 5, and

FIG. 7 is a side elevation of the lever component of such tongs, parts of which are broken away.

While the checking tongs could be of integral construction, it is preferred that they be composed of two principal components which are demountable, one component being a hanger supportable from the upper control arm of an automotive wheel suspension and spanning the wheel suspension and the other being a lever which can be carried by the hanger and engaged with the lower control arm of such a suspension. In FIG. 1 the hanger component is shown as including a substantially straight elongated hook arm 1 carrying at an acute angle to it a bifurcated upright having parallel furcations 2. The lower ends of such furcations may be secured together and held in definitely spaced relationship by a spacer block 2a inserted between and secured to the lower ends of the furcations. The furcations preferably are flat bars disposed with their principal faces parallel. The edges of such bars opposite the hook 1 have in them a plurality of spaced socket notches 3 which, as shown best in FIGS. 3 and 4, slope upwardly from their bottoms to their open ends.

The lever component 4 includes a long arm at one side of the fulcrum pin 5 and a short arm at the opposite side of such pin. Such short arm is shorter than the hook arm 1 projecting from the upright 2 as shown in FIG. 1 and is formed by a bar of a thickness to be lodged between the furcations 2 of the hanger. The fulcrum pin 5 is of a size to fit snugly in any selected set of the socket notches 3 of the hanger. The upper edge of the short lever arm has in it notches 6 for antislip engagement with the lower control arm of a wheel suspension. To facilitate manipulation of the lever, its long arm preferably is formed of two portions bent at an obtuse angle to each other, the portion nearer the fulcrum 5 being shorter than the portion farther from the fulcrum.

The principal hanger and lever components of the tongs shown in exploded relationship in FIG. 1 are assembled for use by inserting the short arm of the lever 4 endwise through the slot between the furcations 2 in a direction such that such short arm will be disposed generally parallel to the hook 1 when the components of the tongs are thus assembled. For some applications of the tongs, it may be desirable to change the location of the lever fulcrum in order to enable the tongs to be applied more readily to a particular type of wheel suspension. For this purpose, the fulcrum 5 can be a loose pin which can be shifted to fit into a hole 7 spaced lengthwise of the lever from the position of the fulcrum 5 shown in FIG. 1. Alternatively, the fulcrum 5 can be a fixed pin and a loose pin 8 can be provided for insertion through the aperture 7 to provide a different fulcrum location. If the pin 5 is fixed and the lever is in the form of a flat bar, the end of the longer portion of the lever can be inserted between the furcations 2 from the hook side until the furcations are located between the fixed pin fulcrum 5 and the aperture 7. The loose pin 8 can then be inserted through such aperture and its ends projecting beyond opposite sides of the lever can be cradled in any selected set of the socket notches 3 of the hanger furcations 2.

A typical wheel suspension of the type to which the checking tongs are intended to be applied is shown in FIGS. 2, 3 and 4. The upper control arm 9 has connected to it the ball joint 10 which carries the spindle support. Such control arm also has a spring perch which engages the upper end of the helical compression spring 11. The lower end of such spring is engaged with a spring perch on the lower control arm 12. In most cases, such lower control arm has a downwardly projecting strengthening rib extending lengthwise of it. The checking tongs of the present invention are applied to the outer ends of the upper and lower control arms of such a wheel suspension straddling the spring 11, so that force can be exerted on such arms in opposition to the force of the spring to move such outer control end arms toward each other slightly. Such movement should be sufficient to relieve the upper ball joint 9 and the lower ball joint (not shown) connecting the spindle support to the lower control arm from the stress exerted by the spring.

In applying the checking tongs to the wheel suspension, the hook 1 of the hanger is hooked over the upper control arm as shown in FIGS. 2, 3 and 4. Such hook is arranged at an acute angle to the hanger' upright, so that even though the upright is not precisely vertical, a downward force applied to it will tend to move the upright toward the upper control arm rather than tending to shift the upright away from the upper control arm and slide the hook off such control arm. When the fulcrum pin 5 is engaged in the proper pair of socket notches 3 on the upright to locate the short arm of the lever immediately beneath the lower control arm, one of the lever notches 6 can be engaged with the rib on the bottom of the lower control arm when the lever is in the broken-line position of FIG. 3 and the full-line position of FIG. 4. If pressure is then applied manually to the long arm of the lever to swing it from the broken-line position to the solid-line position of FIG. 3, the tongs jaws formed by the hook 1 and the short arm of the lever will contract the upper and lower control arms of the wheel suspension so as to relieve the upper and lower ball joints of stress produced by spring 11. The amount of backlash of the wheel suspension ball joints can then readily be detected by moving the wheel spindle support.

Since automotive wheel suspensions differ both in height and in width, it is desirable to provide a substantial number of notches in the upright furcations 2 of the hanger in order to enable the lever fulcrum to be positioned at the appropriate elevation relative to hook 1 over a considerable range. Also, it is desirable both to provide in the short arm of the lever 4 several notches 6 and to provide for at least two different positions of the fulcrum along the length of the lever. FIGS. 2 and 3 show the checking tongs applied to a wheel suspension when the fulcrum 5 nearer the short end of the lever is engaged in a pair of notches 3 of the furcations 2. In FIG. 4 an arrangement of the tongs is shown for fitting a wheel suspension which is wider and not as deep in relaxed condition as the wheel suspension of FIGS. 2 and 3. In this instance, the fulcrum pin 8 is engaged with a pair of the socket notches 3 of furcations 2.

The hanger and lever components of the tongs shown in FIGS. 5, 6 and 7 are of somewhat different construction than those of the tongs shown in FIG. 1, but the tongs of these figures can be used in the same manner. In this instance, the hanger again includes the hook 1 disposed at an acute angle to the bifurcated upright, including furcations 2' but the furcations are of cantilever structure having free lower ends. Again, however, these furcations are of flat bar structure disposed with their principal faces in parallel relationship. Their edges opposite the hook have socket notches 3 in them to receive the opposite ends, respectively, of fulcrum pin 5 which project beyond the opposite sides of the lever.

The lever 4' of the tongs shown in FIGS. 5, 6 and 7 includes a flat bar portion carrying fixed fulcrum pins or dowels 5 and 8', respectively, which are spaced lengthwise of the lever. The short arm of the lever has upwardly opening notches 6 engageable with the lower control arm of a wheel suspension. Again, the long arm of the lever includes two portions disposed at an obtuse angle to each other. The portion at the side of such angle adjacent to the fulcrum 8' is of flat bar structure. In this instance, however, the structure of the long arm portion at the side of the long arm bend remote from the fulcrum is of a construction different from the corresponding portion of the lever shown in FIG. 1.

The long arm of the lever 4' is composed of two portions. One portion is tubular and the other portion has a threaded stub 13 which can be inserted into the adjacent end of the tubular lever arm portion. Such tubular arm portion end has an internal thread 14 which can be screwed onto the stub 13. This threaded connection may be screwed sufficiently tightly to form a permanent connection for all practical purposes, or the threads may be bonded together. Alternatively, such threaded parts can be engaged so that the tubular portion of the lever can be unscrewed from the stub end 13 easily to enable the tongs to be stored more compactly. If desired, the end of the tubular lever portion opposite its end having threads 14 can also be threaded to receive a threaded plug 15.

In FIGS. 6 and 7 one end of the tubular lever portion 4' is fitted over an unthreaded stub 16 of the other lever portion. Such tubular portion and stub can be secured together by pins. Such pins can be removable if it is desired to make the two parts of the lever demountable. Otherwise, such pins can be in the form of rivets to provide a permanent joint. Alternatively or additionally, the two parts of the lever can be welded together, as indicated in FIG. 7, if a permanent joint is desired.

The checking tongs shown in FIGS. 5, 6 and 7 can be used for checking ball joint backlash in an automotive wheel suspension in the manner described with reference to FIGS. 2, 3 and 4. In this instance, however, the short end of the lever 4' can be inserted between the furcations 2' of the hanger by movement longitudinally of the hanger upright between the free ends of the furcations, instead of the short end of the lever being inserted in the direction indicated by the arrow in FIG. 5 generally lengthwise of the lever and transversely of the hanger upright. Such capability is particularly important when it is desired to engage the fulcrum pin 8' with a pair of socket notches 3. In such case the flat bar portion of the lever between fulcrums 5 and 8' can be inserted between the furcations 2' by movement lengthwise of such furcations. The fulcrum pin 8' can then be engaged with a desired pair of socket notches by lengthwise movement of the lever 4' toward the hanger upright from the relationship of the components shown in FIG. 6.

We claim:

1. Checking tongs for detecting backlash in a ball joint of an automotive wheel suspension having upper and lower control arms, comprising upright-elongated wheel suspension spanning means, a hook arm projecting laterally from the upper portion of said spanning means for engaging the upper control arm of the automotive wheel suspension, and a lower arm crossing and carried pivotally by the lower portion of said spanning means, including a first portion at one side of said spanning means engageable with the lower control arm of the wheel suspension and a second, substantially horizontal lever portion at the opposite side of said spanning means and operable by a downward force thereon to effect swinging of said first lower arm portion relative to said spanning means to press said upper and lower control arms toward each other.

2. The checking tongs defined in claim 1, in which the lower arm includes a plurality of fulcrum means spaced lengthwise of such arm selectively engageable with the spanning means to alter the relative lengths of the lower arm portions at opposite sides of the spanning means.